US006399901B1

(12) United States Patent
Nishino et al.

(10) Patent No.: US 6,399,901 B1
(45) Date of Patent: Jun. 4, 2002

(54) WEIGHT FILLER FOR FILLING A VESSEL HAVING A NECK INCLUDING A FLANGE

(75) Inventors: Yukinobu Nishino; Tatsuhiro Nakada; Toshiaki Naka, all of Ishikawa-ken (JP)

(73) Assignee: Shibuya Kogyo Co., Ltd., Kanazawa (JP)

( * ) Notice: Subject to any disclaimer, the term of this patent is extended or adjusted under 35 U.S.C. 154(b) by 0 days.

(21) Appl. No.: 09/558,402

(22) Filed: Apr. 25, 2000

(30) Foreign Application Priority Data

Jul. 27, 1999 (JP) ........................................ 11-212088

(51) Int. Cl.[7] ........................... B65B 1/04; G01G 13/00

(52) U.S. Cl. .......................... 177/52; 177/119; 177/82; 177/54; 177/187; 177/156; 141/372; 141/83

(58) Field of Search ......................... 141/83, 370, 372, 141/369; 177/82, 119, 145, 52, 54, 184, 187, 189, 188, 154, 156

(56) References Cited

U.S. PATENT DOCUMENTS

| | | | | |
|---|---|---|---|---|
| 4,391,774 A | * 7/1983 | Dupain | ........................ | 177/52 |
| 4,453,607 A | * 6/1984 | Zink | .......................... | 177/187 |
| 4,972,882 A | * 11/1990 | Kohashi | ...................... | 141/83 |
| 6,073,667 A | * 6/2000 | Graffin | ........................ | 141/83 |
| 6,302,172 B1 | * 10/2001 | De Villele | .................. | 141/372 |

FOREIGN PATENT DOCUMENTS

| | | |
|---|---|---|
| JP | 4-154501 | 5/1992 |
| JP | 6-28408 | 8/1994 |
| JP | 2509003 | 6/1996 |
| JP | 11-91876 | 4/1999 |

OTHER PUBLICATIONS

Copy of English Language Synopsis of Japanese Utility Model Registered Publication No. 2509003 (1 page).

Copy of English Language Synopsis of Japanese Utility Model Granted Publication No. 6–28408 (1 page).

* cited by examiner

*Primary Examiner*—Randy W. Gibson
(74) *Attorney, Agent, or Firm*—Flynn, Thiel, Boutell & Tanis, P.C.

(57) ABSTRACT

A weight filler 6 is provided which allows a bottle 16 to be conveyed while gripping its neck 16*a*. Load cell 58 is mounted around the outer periphery of a revolving body 54 in order to detect a vertical load. A horizontal rod or load applicator 64 projects radially outward from the load cell 58. A gripper 50 which grips the bottle 16 under the resilience of tension springs 82 is mounted on the free end 64*a* of the rod 64. As the bottle 16 is urged into the gripper 50 in a direction opposite from the direction in which, the rod 64 projects, the gripper 50 is once opened against the tension springs 82 and then closed to grip the neck 16*a* of the bottle 16. A filling nozzle 52 is disposed above the bottle 16 which is gripped by the gripper 50, and fills the bottle 16 with liquid. During the filling operation, the load cell 58 detects a load applied, thus allowing a filling of a given amount in accordance with the detection.

5 Claims, 4 Drawing Sheets

WEIGHT FILLER FOR FILLING A VESSEL HAVING A NECK INCLUDING A FLANGE

BACKGROUND OF THE INVENTION AND RELATED ART STATEMENT

The invention relates to a vessel filling apparatus having load detecting capabilities, commonly known as a weight filler in the art, which fills a vessel having a neck including a flange while measuring its weight by means of a load cell.

A conventional weight filler comprises a plurality of bottle mounts circumferentially spaced apart at an equal spacing around the outer periphery of a revolving body, a plurality of load cells mounted on the revolving body and each connected to one of the bottle mounts to measure the weight of a particular bottle on the bottle mount, and a plurality of filling nozzles mounted above respective bottle mounts, the arrangement being such that as a bottle is fed to each bottle mount, the associated filling nozzle fills the bottle with liquid while measuring the weight thereof by means of the load cell during the time the bottle is conveyed rotatively as the revolving body rotates (see, for example, Japanese Laid-Open Patent Application No. 154, 501/1992).

Resin bottles, in particular, PET bottles which find extensive application as liquid filled vessels are very light in weight and unstable, and thus cannot be rapidly conveyed by using a usual conveyor without undergoing a considerable amount of difficulty. Accordingly, their necks are formed with flanges, which are supported from the underside. Alternatively, their necks are carried by grippers for purpose of conveyance of the bottles.

In a filling system in which the filling operation takes place while the bottle necks are being carried, a bottle which is conveyed on a pneumatic conveyor, for example, has its neck gripped by a gripper of an introduction wheel to be handed over to gripper of a filler where it is rotatively conveyed while a filling nozzle fills it with liquid, and the bottle is then handed over to a bottle processor such as a capper through an intermediate wheel which transfers it while carrying its neck.

After desired processing operations are completed, it is discharged onto a delivery conveyor to be fed to a subsequent step.

A processing system which utilizes neck-carrying conveyance performs the conveyance on the basis of the height of the neck of the resin bottle which is being carried, and exhibits an excellent flexibility in that there is no need for the adjustment of elevations of various processors, conveyor and wheels if it is used with bottles of varying size. However, as mentioned above, the conventional weight filler is constructed such that the measurement and the filling of the bottle take place after it is once placed on the bottle mount connected to the load cell. Accordingly, if the weight filler is assembled into this system, there arises a problem that the bottle which has been subject to the neck-carried conveyance must be once released from the gripper onto the bottle mount. As a consequence, if the conveying and processing system combined with the conventional weight filler is to be used with bottles of varying size, an adjustment of elevation of the conveyor and the like is required, which is difficult to accommodate.

OBJECT AND SUMMARY OF THE INVENTION

It is an object of the invention to provide a weight filler for use with the conveying and processing system for resin bottles which allows the bottle to be filled with liquid while gripping the bottle neck for conveyance.

Above object is accomplished by the provision of a load cell installed to detect a vertical load, a load applicator projecting horizontally from the load cell, grip means mounted on the load applicator for resiliently carrying the neck of the bottle which is urged in a direction opposite from the direction in which the load applicator projects from the load cell, and a filling nozzle for filling the bottle which is carried by the grip means with liquid, the liquid being filled into the bottle gripped by the grip means in a given amount while detecting the load by means of the load cell.

Above object is also accomplished by the provision of a load applicator provided in a manner projecting from a load cell, grip means mounted on the load applicator so as to be rotatable in a horizontal plane for resiliently gripping a bottle neck, rotation restricting means for maintaining the load applicator and the grip means in a given positional relationship to restrict a relative rotation thereof and for releasing the restriction in response to a load in excess of a predetermined value, and a filling nozzle for filling the bottle gripped by the grip means with liquid, a given amount of liquid being filled into the bottle gripped by the grip means while detecting the load by the means of the load cell.

DETAILED DESCRIPTION OF THE PREFERRED EMBODIMENT

Figure 1:
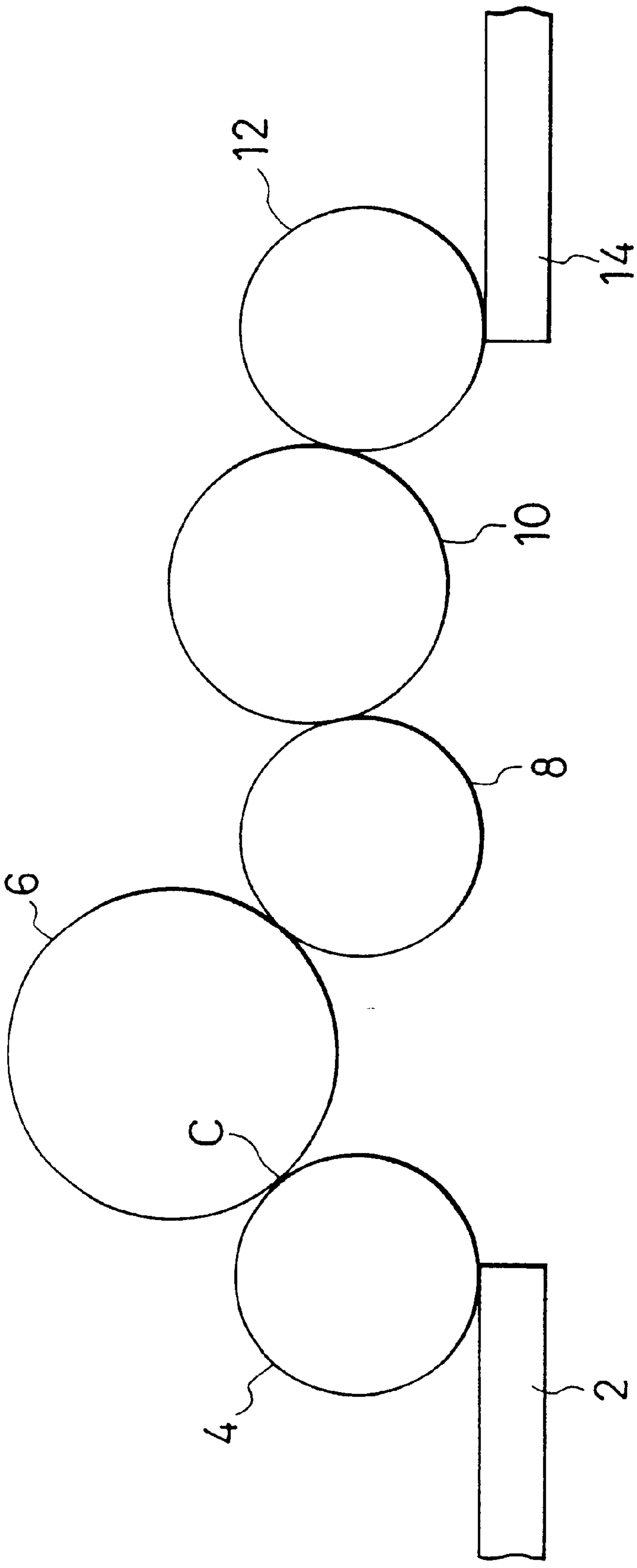
FIG. 1 is a plan view illustrating an entire conveying and processing system for resin bottles including a weight filler according to one embodiment of the invention.

A weight filler according to the invention will be described below with reference to an embodiment thereof shown in the drawings. Initially, an overall arrangement will be described briefly with reference to FIGS. 1 and 2. A bottle feed conveyor 2 conveys, as by pneumatic conveyance, a resin bottle 16 (see FIG. 2), the neck 16*b* of which is gripped by a gripper 84 on an introduction wheel 4 to be rotatively carried until the bottle reaches a hand-over position C where it is handed over to a gripper 50 of a weight filler 6. As will be described later, the gripper 50 of the weight filler 6 resiliently holds the underside of a flange 16*c* formed on the neck 16*a* of the bottle 16, and rotatively conveys the latter while suspending it.

In the weight filler 6, a filling nozzle 52 which is located above the resin bottle 16 gripped by the gripper 50 fills the bottle 16 with liquid during the time when the gripper 50 conveys it while holding the underside of the flange 16*c* of the resin bottle 16. The,resin bottle 16 which is internally filled with liquid is handed over to the capper 10 through an intermediate wheel 8, and after it is capped, the bottle is delivered through a delivery wheel 12 onto a delivery conveyor 14 to be fed to the succeeding step. It should be noted that the neck carrying conveyance which takes place while gripping the neck (or the cylindrical portion 16*d* of a reduced diameter) of the resin bottle 16 or supporting the underside of the flange 16*c* formed on the neck also takes place at each of the intermediate wheel 8, the capper 10 and the delivery wheel 12.

Figure 2:
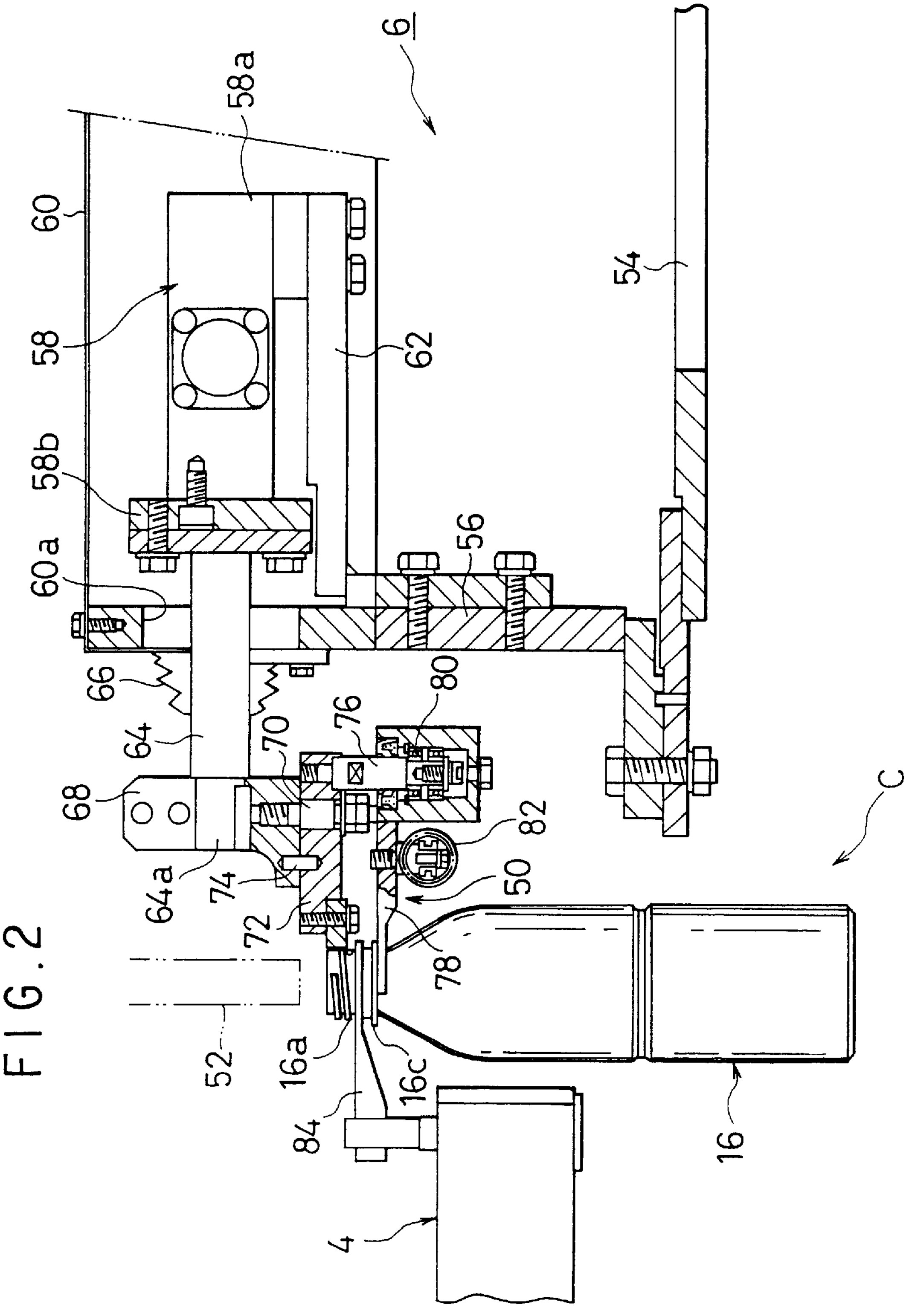
FIG. 2 is a longitudinal section, showing an essential part of the weight filler of the embodiment.

The weight filler 6 will be described in more detail with reference to FIGS. 2 and 3. The weight filler 6 includes a revolving body 54 which rotates in a horizontal plane about a vertical axis, not shown (which is assumed to be located to the right of FIG. 2), and a load cell 58 is mounted toward the outer periphery of the revolving body 54 through a vertical mounting plate 56. A box 60 is mounted on an upper portion of the vertical mounting plate 56 and includes a horizontal stationary base 62 on which one end 58*a* of the load cell 58 or the end disposed radially inward of the revolving body 54 is fixedly mounted while the other end 58*b* is supported in a manner floating over the stationary base 62. A rod or load applicator 64 which projects horizontally along a radial line of the revolving body 54 is mounted on the other end 58*b* of the load cell 58 for detecting a vertical rod applied to its free end 64*a*. On its front side, the box 60 is formed with a large opening 60*a* for avoiding an interference in the event of occurrence of flexure of the rod 64, the opening 60*a* being covered by a boot 66.

A gripper mounting block 68 is fixedly mounted on the free end 64*a* of the rod 64 and has a lower surface in which one end of a vertical support shaft 70 is inserted and fixedly connected. The lower end of the support shaft 70 is rotatably connected with a neck support plate 72, the front surface of which is formed with a semi-arcuate recess 72*a* (see FIG. 3) having an internal diameter which substantially coincides with the external diameter of the thread 16*a* of the bottle 16. A shear pin 74 extends between the lower surface of the gripper mounting block 68 and the upper surface of the support plate 72 to restrict a relative rotation between the block 68 and the plate 72. The shear pin 74 is designed to break in response to a rotational load in excess of a predetermined value applied to the neck support plate 72, thereby allowing the support plate 72 to rotate in a horizontal plane.

Figure 3:
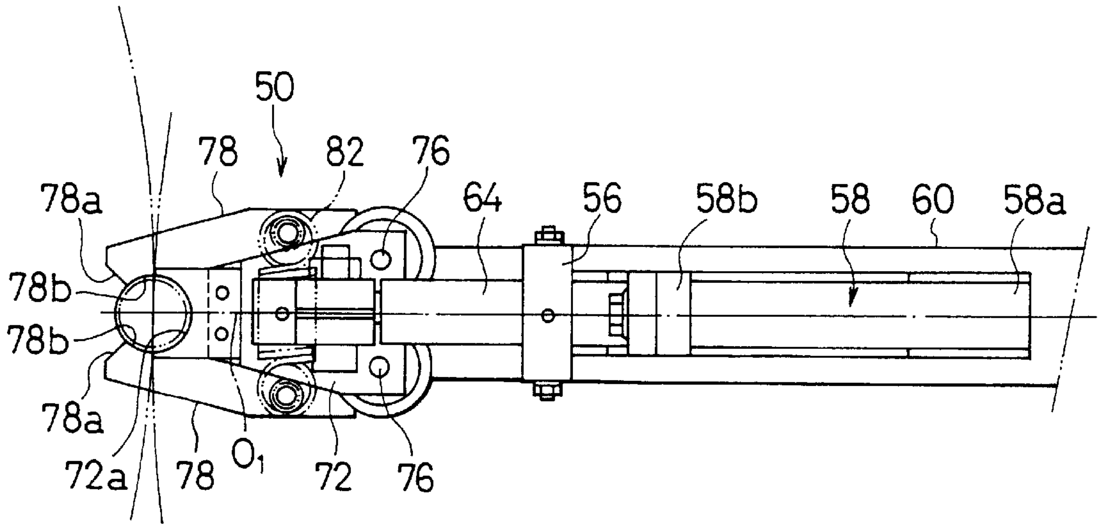
FIG. 3 is a plan view of FIG. 2.

A pair of vertical pivot shafts 76 are fixedly mounted in the lower surface of the neck support plate 72 at locations which are symmetrical to the center line $O_1$ of the plate 72 (see FIG. 3). One end of each arm 78 is rotatably mounted on each pivot shaft 76 through an interposed bearing 80. The both arms 78 are normally urged toward each other by tension springs 82. Free ends 78*a* of the both arms 78 are notched in a tapered manner to facilitate the movement of the neck or more exactly the lower portion of the flange 16*c* of the resin bottle 16, and the notched ends 78*a* are followed by arcuate portions 78*b* having an internal diameter which substantially coincides with the external diameter of the neck (the lower part of the flange 16*c*) of the resin bottle 16. The both arms 78, the tension springs 82 and the pivot shafts 76 form together in combination grip means or gripper 50 which grips the resin bottle 16.

A filling nozzle 52 is disposed above the resin bottle 16 which is gripped by the gripper 50, and during the time the resin bottle 16 which is gripped by the gripper 50 rotates together with the rotation of the revolving body 54, a filling valve, not shown, is opened to allow the, filling nozzle 52 to fill the resin bottle 16 with liquid.

The operation of the weight filler 6 constructed in the manner mentioned above will now be described. The resin bottle 16 which is conveyed on the feed conveyor 2 is gripped by a gripper 84 which is disposed toward the outer periphery of the introduction wheel 4. As shown in FIG. 2, the gripper 84 of the introduction wheel 4 grips the resin bottle 16 at a location which is disposed above the flange 16*c* formed on the neck of the bottle 16. As the introduction wheel 4 rotates to move the gripper 84 which holds the resin bottle 16 close to a hand-over position C (see FIG. 1) to the weight filler 6, the neck of the resin bottle 16 is gradually driven radially inward along the tapered surface 78*a* at the free ends of the both arms 78 of the gripper 50 on the weight filler 6.

As the neck (or the lower part of the flange 16*c*) of the resin bottle 16 is driven inward along the tapered surfaces 78*a*, the both arms 78 are gradually driven apart against the resilience of the tension springs 82 until the neck of the resin bottle 16 is fitted inside the arcuate portions 78*b* on the inner surfaces of the both arms 78, whereupon the both arms 78 are again urged toward each other by the tension springs 82, thus allowing the both arms to grip the neck of the resin bottle 16 from the opposite sides under the influence of such resilience. When the gripper 50 grips the neck of the resin bottle 16, the arcuate recess 72*a* formed in the front end face of the neck support plate 72 which is disposed above the gripper 50 abuts against the neck of the resin bottle 16 at a location above the flange 16*c*, thus supporting the resin bottle 16 in a stable manner. In the present embodiment, the gripper 50 of the weight filler 6 is designed to grip the underside of the flange 16*c* formed on the neck of the resin bottle 16 while the neck support plate 72 disposed above the gripper 50 is designed to abut and support the bottle at a location above the location which is gripped by the gripper 84 of the introduction wheel 4.

As mentioned previously, the resin bottle 16 is driven into the gripper 50 to be gripped thereby in a direction which is substantially opposite from the direction in which the load applicator or rod 64 projects from the load cell 58, whereby a biased load or moment acting upon the load cell 58 can be reduced. In this manner, there is obtained the weight filler 6 which permits the neck carrying conveyance, and accordingly, the entire filling system which uses the weight filler 6 can be constructed with a conveying system which is based on the neck position of the resin bottle.

In addition, in the weight filler 6, the load cell 58 which is installed to detect the vertical load is allowed to be flexed in the vertical direction while an urging load is applied to the horizontally projecting load applicator 64 in a direction which is opposite from the projecting direction. As a result of such arrangement, a flexure of the load cell 58 during the hand-over of the bottle can be prevented. If a flexure of the load cell 58 is allowed and the flexure is converted into oscillation as a result of reaction, a measurement of the weight will be influenced. However, with the arrangement of the present invention, a flexure of the load cell 58 during the hand-over of the resin bottle is prevented, advantageously avoiding the adverse influence upon the measurement of the filled weight.

Figure 4:
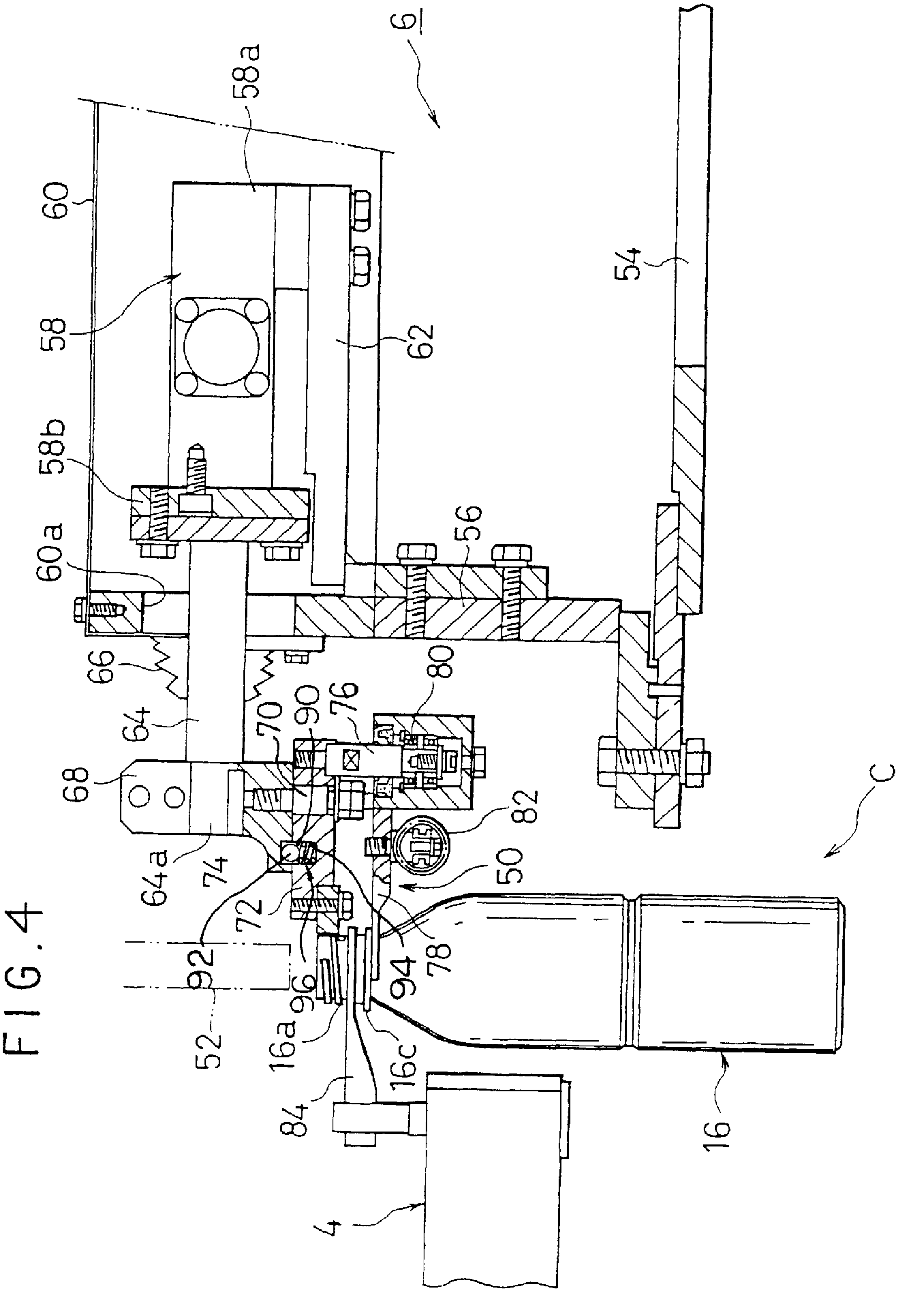
FIG. 4 is a longitudinal section of a weight filler according to an alternate embodiment of the invention.

It will be appreciated that if the resin bottle 16 can not be successively handed over to the gripper 50 as a result of jamming during the hand-over of the resin bottle 16 from the introduction wheel 4 or to the intermediate wheel 8 to load the introduction wheel 4 or to the intermediate wheel 8 to load the gripper 50 in the rotational direction, the neck of the resin bottle 16 may not be able to be received within the arcuate recess 72*a* formed in the front end face of the support plate 72 to cause a rotational load of an increased magnitude upon the support plate 72 also, but in the arrangement of the present invention, the shear pin 74 will break in response to a biased load in excess of a predetermined value applied to permit the support plate 72 to rotate, thus eliminating the likelihood of damaging the load cell 58. However, it should be understood that the rotation restricting means which restricts the rotation of the support plate 72 and the gripper 50 until a load in excess of a predetermined value is applied is not limited to the shear pin 74, but may comprises any other means known in the art. For example, as illustrated in FIG. 4, a positioning recess 90 may be formed in the lower surface of the gripper mounting block 68 while a ball 92 which is urged by a spring 94 to project above the upper surface of the neck support plate 72 may be provided for resilient engagement with the recess to define a ball plunger 96, thus restricting and releasing the rotation.

What is claimed is:

1. A weight filler for filling a bottle having a neck including a flange comprising:

a base;

a load cell having an end mounted to the base and being configured to detect a vertical load;

a load applicator horizontally projecting from the load cell;

grip means mounted on the load applicator and configured to resiliently grip the neck of the bottle below the flange, wherein the bottle is driven inward in a direction which is opposite from the direction in which the load applicator projects from the load cell;

a neck support plate mounted on the load applicator in a location vertically offset from the grip means, wherein an arcuate recess is formed in a front end face of the neck support plate and the neck support plate is configured to abut and support the neck of the bottle above the flange; and a filling nozzle for filling the bottle which is gripped by the grip means with liquid, wherein the bottle is gripped by the grip means to abut the neck plate and the filling nozzle fills the bottle while the: load cell detects the weight of the bottle.

2. A weight filler for filling a bottle having a heck including a flange comprising:

a base;

a load cell having an end mounted to the base;

a load applicator projecting from the load cell;

grip means mounted on the load applicator and being rotatable within a horizontal plane, the grip means being configured to resiliently grip the neck of the bottle;

rotation restriction means configured to maintain the load applicator and the grip means in a given orientation restricting relative rotation therebetween, the rotation restriction means configured to release the rotation restriction in response to a load in excess of a predetermined value; and a filling nozzle for filling the bottle which is gripped by the grip means with liquid, wherein the filling nozzle fills the bottle gripped by the grip means while the load cell detects the weight of the bottle.

3. A weight filler according to claim 2, wherein the rotation restriction means comprises a pin positioned between the load applicator and the grip means, and further wherein the pin is configured to break in response to a rotational load in excess of the predetermined value.

4. A weight filler according to claim 3, wherein a mounting block is fixedly mounted on the load applicator and is connected to a neck support plate which is rotatable in a horizontal plane;

the grip means is mounted on the load applicator through the neck support plate; and the pin is positioned between the mounting block and the neck support plate.

5. A weight filler according to claim 2, wherein the rotation restriction means comprises a ball plunger including a positioning recess in one of the load applicator and the grip means, and a ball mounted on the other of the load applicator and the grip means, wherein the ball is urged by a spring to resiliently engage the positional recess.

* * * * *

UNITED STATES PATENT AND TRADEMARK OFFICE
CERTIFICATE OF CORRECTION

PATENT NO. : 6,399,901 B1
DATED : June 4, 2002
INVENTOR(S) : Yukinobu Nishino et al.

It is certified that error appears in the above-identified patent and that said Letters Patent is hereby corrected as shown below:

Column 5,
Line 29, please delete ":".
Line 31, replace "heck" with -- neck --.

Signed and Sealed this

Twenty-sixth Day of November, 2002

*Attest:*

JAMES E. ROGAN

*Attesting Officer*

*Director of the United States Patent and Trademark Office*